(12) United States Patent
Maxson et al.

(10) Patent No.: US 10,594,364 B2
(45) Date of Patent: *Mar. 17, 2020

(54) CHARACTERIZING INGRESS NOISE (71) Applicant: VIAVI SOLUTIONS INC., Milpitas, CA (US)

(72) Inventors: Ben Maxson, Beech Grove, IN (US); Daniel K. Chappell, Greenwood, IN (US); Jim Walsh, Westfield, IN (US)

(73) Assignee: VIAVI SOLUTIONS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,197

(22) Filed: May 25, 2016

(65) Prior Publication Data

US 2016/0336998 A1    Nov. 17, 2016

Related U.S. Application Data (63) Continuation of application No. 14/033,077, filed on Sep. 20, 2013, now Pat. No. 9,357,163.

(Continued)

(51) Int. Cl.
*H04N 21/262* (2011.01)
*H04B 3/46* (2015.01)
*H04N 7/10* (2006.01)
*H04N 17/00* (2006.01)
*H04N 21/61* (2011.01)
*H04L 27/26* (2006.01)
*H04N 21/4402* (2011.01)

(Continued)

(52) U.S. Cl.
CPC ........... *H04B 3/46* (2013.01); *H04B 17/0082* (2013.01); *H04H 20/12* (2013.01); *H04L 12/2801* (2013.01); *H04L 27/2626* (2013.01); *H04N 7/102* (2013.01); *H04N 17/00* (2013.01); *H04N 21/2383* (2013.01); *H04N 21/262* (2013.01); *H04N 21/42221* (2013.01); *H04N 21/6118* (2013.01); *H04N 21/234354* (2013.01); *H04N 21/440254* (2013.01)

(58) Field of Classification Search
CPC ........... H04N 21/262; H04N 21/42221; H04N 7/102; H04N 17/00; H04N 21/2383; H04N 21/6118; H04N 21/234354; H04N 21/440254; H04B 3/46; H04B 17/0082; H04H 20/12; H04L 12/2801; H04L 27/2626
USPC ........................................ 725/125, 127, 129
See application file for complete search history.

(56) References Cited

U.S. PATENT DOCUMENTS 4,520,508 A    5/1985   Reichert, Jr.
5,737,461 A    4/1998   Sanders et al.
(Continued)

FOREIGN PATENT DOCUMENTS

CA    2308497    9/1999
WO    2000031957  6/2000

*Primary Examiner* — James R Sheleheda
*Assistant Examiner* — Franklin S Andramuno
(74) *Attorney, Agent, or Firm* — Mannava & Kang, P.C.

(57) ABSTRACT

Methods and devices for characterization of repetitious noise in cable networks are disclosed. A frequency band of interest is identified, a time trace of a signal parameter within the frequency band is obtained, and an autocorrelation of the time trace is computed to detect repetitious noise. The repetition frequency can serve as an indicator of the noise source type, and thus it can assist in noise segmentation.

19 Claims, 11 Drawing Sheets

Related U.S. Application Data (60) Provisional application No. 61/703,538, filed on Sep. 20, 2012.

(51) Int. Cl.

| | | |
|---|---|---|
| *H04N 21/2343* | (2011.01) | |
| *H04H 20/12* | (2008.01) | |
| *H04L 12/28* | (2006.01) | |
| *H04N 21/2383* | (2011.01) | |
| *H04N 21/422* | (2011.01) | |
| *H04B 17/00* | (2015.01) | |

(56) References Cited

U.S. PATENT DOCUMENTS

| | | | |
|---|---|---|---|
| 5,742,713 A | 4/1998 | Sanders et al. | |
| 6,151,559 A | 11/2000 | Williams | |
| 6,327,709 B1 | 12/2001 | Ovadia et al. | |
| 6,425,132 B1 | 7/2002 | Chappell | |
| 6,574,797 B1 | 6/2003 | Naegeli et al. | |
| 6,690,805 B1 * | 2/2004 | Tsuji | H03G 3/345 381/13 |
| 6,757,522 B1 | 6/2004 | Naegeli et al. | |
| 6,775,840 B1 | 8/2004 | Naegel et al. | |
| 6,880,170 B1 * | 4/2005 | Kauffman | H04N 7/102 348/E7.052 |
| 6,978,479 B2 | 12/2005 | Thach | |
| 7,024,680 B2 | 4/2006 | Howard | |
| 7,254,827 B1 | 8/2007 | Terreault | |
| 7,908,639 B2 * | 3/2011 | Hamada | H04H 20/74 725/146 |
| 8,121,017 B2 * | 2/2012 | Stadelmeier | H04N 21/4385 370/203 |
| 8,411,807 B1 * | 4/2013 | Rangarajan | H04L 69/22 375/316 |
| 8,458,759 B2 | 6/2013 | Zinevich | |
| 9,357,163 B2 * | 5/2016 | Maxson | H04H 20/12 |
| 2003/0021237 A1 * | 1/2003 | Min | H04L 1/0001 370/252 |
| 2003/0149991 A1 | 8/2003 | Reidhead et al. | |
| 2004/0094019 A1 * | 5/2004 | Herre | G10H 1/40 84/611 |
| 2005/0259767 A1 * | 11/2005 | Garmany | H04B 7/005 375/343 |
| 2007/0057709 A1 * | 3/2007 | Miyazaki | H03L 7/07 327/156 |
| 2008/0320541 A1 | 12/2008 | Zinevich | |
| 2009/0091655 A1 * | 4/2009 | Russell | H04N 21/2368 348/515 |
| 2012/0120768 A1 * | 5/2012 | Horsky | G01S 7/536 367/93 |
| 2013/0339802 A1 * | 12/2013 | Carlough | G06F 11/34 714/45 |
| 2014/0030981 A1 * | 1/2014 | Shaw | H04B 1/10 455/63.1 |

* cited by examiner

CHARACTERIZING INGRESS NOISE

CROSS-REFERENCE TO RELATED APPLICATIONS

Priority

This application is a Continuation of commonly assigned and co-pending U.S. patent application Ser. No. 14/033,077, having a filing date of Sep. 20, 2013, which claims the benefit of the priority of U.S. Provisional Application Ser. No. 61/703,538, having a filing date of Sep. 20, 2012, the disclosures of which are hereby incorporated by reference in their entireties.

TECHNICAL FIELD

The present invention relates to cable network maintenance, and in particular, to characterizing ingress noise in a cable network.

BACKGROUND OF THE INVENTION

A cable network delivers sources such as digital television, Internet, and Voice-over-IP (VoIP) phone connection. The services are delivered over a tree-like network of a broadband coaxial cable termed a 'cable plant'. Digital television signals are broadcast from a headend connected to the trunk of the cable plant, and delivered to subscribers' homes connected to the branches of the cable plant. In going from the headend to the subscribers, the signals are split many times, and are attenuated in the process. Accordingly, a strong downstream broadcast signal is required, so that the signal level at the subscribers' premises is strong enough to be reliably detected.

Internet and VoIP services use signals directed from the subscribers' premises back to the headend, or "upstream" relative to the broadcast signal, which is accordingly termed "downstream" signal. The tree-like structure of the cable plant ensures that the upstream signals are brought together into the common trunk connected to the headend. Time-division multiplexing (TDM) is used to ensure that the upstream signals do not interfere with each other as they are combined.

Unfortunately, not only the upstream signals, but also noise can propagate in the upstream direction. The noise originates at customers' premises due to improper cable grounding or shielding, non-professional equipment installation, loose connectors, unshielded indoor equipment such as electrical motors, TV sets, and the like. This ingress noise is particularly problematic in the upstream direction, because as it propagates from many end locations towards the common trunk of the cable plant, it tends to accumulate and grow in magnitude, compromising or even completely disabling digital communications, at least for some subscribers. A further problem for the upstream direction is that the upstream signals occupy a lower frequency band, typically from 5 MHz to 45 MHz, as compared to the downstream signals spanning typically from 50 MHz to 1 GHz. Thus, the upstream signals are closer in frequency to ingress noise, which tends to be a low-frequency noise.

The problem of the upstream ingress noise has long since been recognized. About 80% of a cable network technician's time is typically devoted to trucking down and fixing return path noise. Starting at the final common point, the technician determines which branch of the network is contributing the most noise to the network. Once to "noisy" branch is selected, the technician drives down to the next split point on that branch, and again determines the branch the noise is coming from. The technician keeps traveling down the plant and making measurements, until a specific network element, a shielding fault, or a home is identified as the noise source. Statistically, about 80% of radio-frequency (RF) noise has been found to have originated from a specific single customer's home.

Reichert in U.S. Pat. No. 4,520,508 discloses a system having a central station and a plurality of subscriber terminals specifically adapted to monitor ingress noise. Each subscriber terminal monitors certain frequencies and then provides signal level information to the headend controller. Once the headend controller has received signal level information from all of the subscriber terminals, the signal level information from all of the subscriber terminals is compared. By comparing signal levels of differently located subscriber terminals, a source of ingress may often be narrowed to a location between two of such subscriber terminals.

Gotwals et al. in Canadian Patent 2,308,497 disclose an improvement of the Reichert device. A impairment detection system of Gotwals et al. includes a plurality of remote units, which monitor one or more frequencies to be tested in a synchronized manner. By monitoring frequencies to be tested in a synchronized manner, intermittent leakage signals may be accurately measured and located.

Chappel in U.S. Pat. No. 6,425,132 discloses a method and apparatus for ingress testing a two-way cable network, which provides for remote selection of nodes to be tested and remote viewing of ingress test measurements obtained from the selected node. The "ingress modem" measures upstream spectrum and reports it to the headend.

Zimmerman in U.S. Pat. No. 6,978,476 discloses a device constructed to measure a local level of ingress noise at a test frequency, and to display the level of the measured noise. The device is attached at a cable junction outside of a building. A radio frequency signal at the test frequency is the radiated at the building from to test van. A technician driving the test van determines the local level of ingress by looking at the display of the device. Detrimentally, systems of Reichert, Gotwals, Chappel, and Zimmerman require custom probe installation, and thus are relatively complex.

Sanders et al. in U.S. Pat. Nos. 5,737,461 and 5,742,713 disclose an upstream ingress filter including a remote controllable relay that can pull the entire upstream band down (connect to ground) at a particular location, thus allowing remote segmentation of ingress noise. Detrimentally, when the upstream hand at the particular location is pulled down, the normal upstream communication is disabled, disrupting the subscriber's Internet and VoIP phone services.

SUMMARY OF THE INVENTION

By performing multiple experiments and measurements of ingress noise in cable networks, the inventors have determined that the ingress noise is often repetitious in nature. It has been determined that different noise sources have different repetitious properties, in addition to different spectral properties. Accordingly, traditional methods of upstream noise characterization and/or segmentation can be enhanced by measuring and accounting for repetitious properties of the ingress noise.

In accordance with the invention, there is provided a method for characterizing ingress noise in a cable network, the method comprising:

(a) identifying a first frequency band of a cable signal at a first location in the cable network;

(b) obtaining a time trace of a parameter of the cable signal in the first frequency band identified in step (a); and (c) computing an autocorrelation function of the time trace, wherein a first autocorrelation peak at a non-zero time delay is indicative of a repetitive component of the ingress noise.

From the time delay of the first autocorrelation peak, a repetition frequency of the repetitive noise component can be determined. This process can be repeated at a second location, where the noise source at the determined repetition frequency is more likely to be found.

The method can also include (d) displaying a frequency spectrum of the cable signal at the first cable network location, the frequency spectrum having a first peak in the first frequency band due to the first repetitive component; and (e) displaying the first repetition frequency of the first repetitive component.

In accordance with the invention, there is further provided a device for carrying out the above method, the device comprising an input terminal for coupling to the first cable network location, a procession unit coupled to the input terminal and configured for performing at least steps (b) and (c) above, and a display coupled to the processing unit and configured for performing steps (d) and (c), e.g. displaying the spectral peaks and their repetitious properties.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
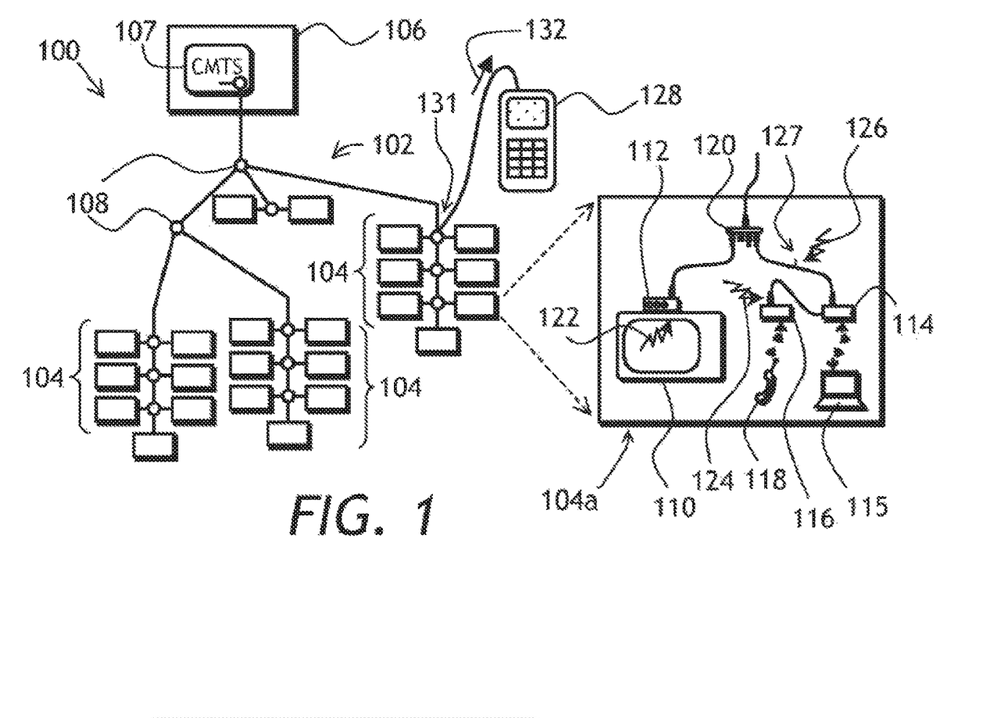
FIG. 1 is a block diagram of a cable network, showing ingress noise sources and a tester of the invention.
Figure 2:
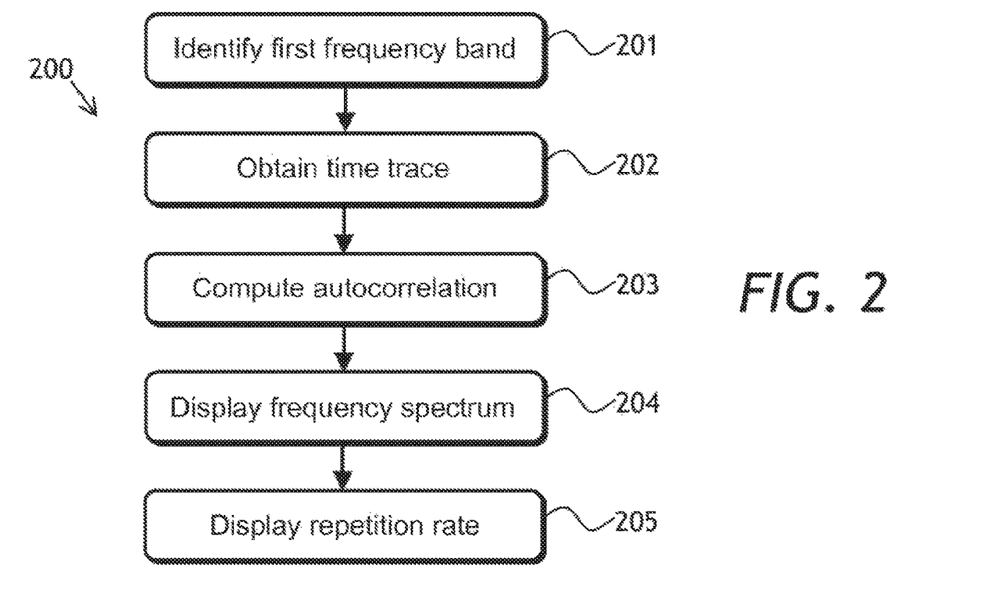
FIG. 2 is a flow chart of a method for characterizing ingress noise according to the invention.

Referring to FIG. 1, a cable network 100 includes a cable plant 102 connecting multiple customer premises 104 and 104a to a headend 106. The customer premises 104 and 104a are connected via nodes 108. The right-hand customer premises 104a are expanded to show an analog TV set 110 connected to a TV set-top box 112, a cable modem 114 in a wireless communication with a laptop computer 115, and a VoIP phone adaptor 116 connected to a phone 118. The TV set-top box 112 and the cable modem 114 are connected to the cable plant 102 via a common cable splitter 120. A Cable Modem Termination System (CMTS) 107 is disposed at the headend 106. Its function is to establish and maintain communication with the cable modems 114 installed in all customer premises 104.

Several exemplary sources of ingress noise are shown in the customer premises 104a. The ingress noise sources include an analog TV sync signal 122, a power line ingress 124, and a RF ingress 126 entering the cable through a delaminated cable shielding 127. All these sources enter the cable plant 102 and travel towards the headend 106, impeding communications with other customer premises 104.

To identify the problematic customer remises 104a where the ingress noise 122, 124, and 126 is generated, a tester 128 is coupled at a first location 131 to receive a cable signal 132. According to the invention the tester 128 is constructed and/or programmed to determine not only spectral but also repetitious properties of ingress noise, as follows.

Referring to FIG. 2 and FIGS. 3A to 3C with further reference to FIG. 1, a method 200 for characterizing ingress noise, such as the noise 122, 124, and 126 in the cable network 100, includes a step 201 of identifying a first frequency band 101 (FIG. 3A) of the cable signal 112 at the first location 131 in the cable network 100. In a step 202, a time trace 302 (FIG. 3B) of the amplitude of the cable signal 132 in the first frequency band 301 is captured by the tester 128. In this illustrative example, the time trace 302 includes a plurality of well-defined ingress noise peaks 121, 322, 323 . . . at times $t_1$, $t_2$, $t_3$ separated by a time interval $\Delta t$, that is, the ingress noise is periodic.

In a step 201, the tester 128 computes an autocorrelation function 303 (FIG. 3C) of the time trace 302. Referring specifically to FIG. 3C, the autocorrelation function 303 has a plurality of peaks 330, 331, 332 . . . separated by a first time delay equal to $\Delta t$. As with any autocorrelation function, the first peak 330 is at zero time delay. The first peak at non-zero time delay $\Delta t$ is the next autocorrelation peak 331. It is indicative of a repetitive component of the ingress noise, for example, the TV sync signal 122, the power line ingress 124, and the RE ingress 126 entering the cable plant 102. The autocorrelation function 303 is preferably a cyclic autocorrelation.

Each type of ingress noise has its own characteristic repetition rate. For example, noise repeating at submultiples of 16.67 ms (US) or 20 ms (Europe) is characteristic of the power line ingress noise 124; noise repeating at 15.73426 kHz (NTSC) or 15.625 kHz (PAL) is characteristic of the analog TV sync signal 122. Thus, the measured value of Δt is indicative of a type of the ingress noise.

Referring back to FIG. 2, the tester 128 can report the measured value of Δt back to the headend 106. Alternatively or in addition, in an optional step 204, the tester 128 can display a frequency spectrum 310 (FIG. 3A) of the cable signal 132, the frequency spectrum 310 having a first peak 311 in the first frequency band 301 due to the repetitive component of the ingress noise. In a step 205 (FIG. 2), the tester 128 can display a first repetition frequency 312 associated with the peak 311.

Figure 3A:
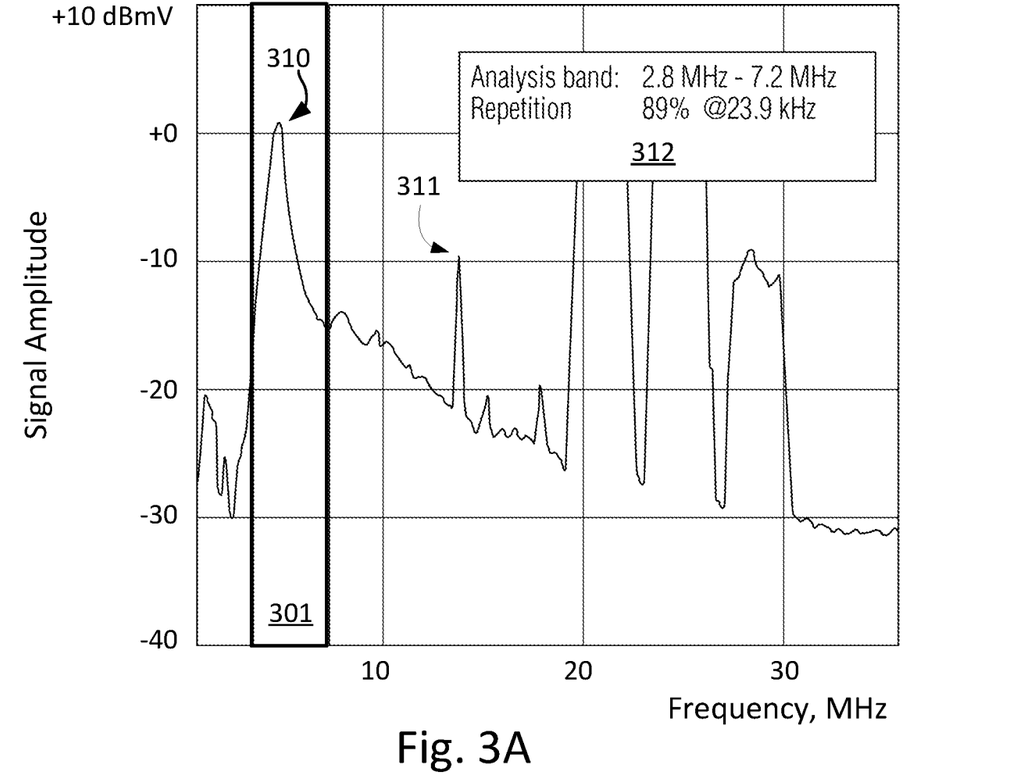
FIG. 3A is a spectral plot showing a noise frequency band to illustrate the method of FIG. 2.
Figure 3B:
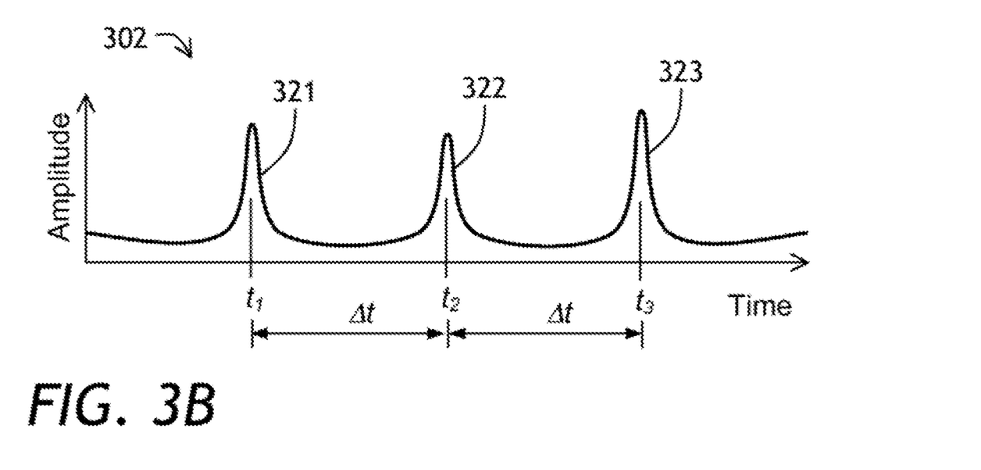
FIG. 3B is a time trace of a signal amplitude in the noise frequency band of FIG. 3A.
Figure 3C:
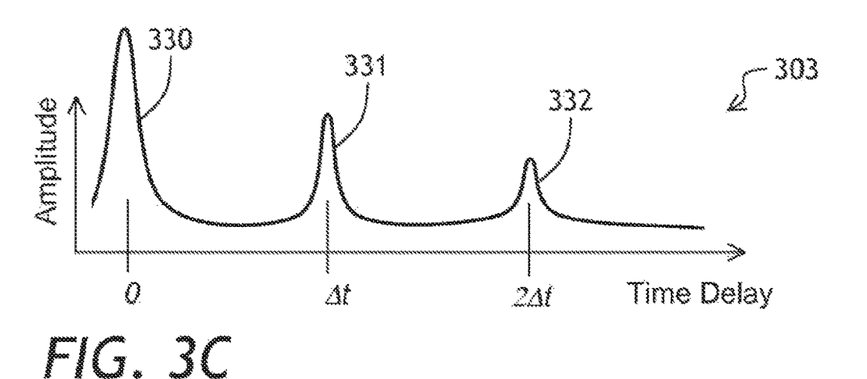
FIG. 3C is an autocorrelation function of the time trace of FIG. 3B.

The first step 201 of the method 200 can be performed by identifying, either automatically or manually, the noise peak 311 in the frequency spectrum 310 of the cable signal 132 at the first location 131, and selecting the first frequency band 301 to include a central frequency of the noise peak 311, as shown in FIG. 3A. The spectrum 310 can be measured by a spectrum analyzer module, not shown, included in the tester 128 as a hardware element and/or as a software/firmware function. Once the spectrum 310 is obtained, a user of the tester 128 can select specific frequencies of interest, or frequency bands of interest, within the full frequency span of the spectrum 310. Alternatively, the first frequency band 301, and optionally other frequency bands of interest, can be remotely provided by the headend 106 of the cable network 100.

The time trace 302 can be obtained by dwelling the spectrum analyzer module at the first frequency band 301 for a period of time, and capturing an output signal of the spectrum analyzer module. Alternatively, a real-time fast Fourier transform (FFT) of the obtained spectrum 310 can be performed to obtain the time trace 302.

In one embodiment, the first frequency band 301 can include an upstream digitally modulated channel, not shown. In this case, the second step 202 can include demodulating the cable signal 132 and obtaining a symbol error vector of the demodulation. A time trace of the symbol error vector is then constructed and processed in a same manner as the signal amplitude that is, an autocorrelation function can be computed, and peaks of that autocorrelation function can be detected. A time trace of the error vector or any other parameter of the signal in the first frequency band 301 can be obtained in the second step 202, and the autocorrelation of that time trace can be calculated in the third step 203 of the method 200 of FIG. 2.

Figure 4:
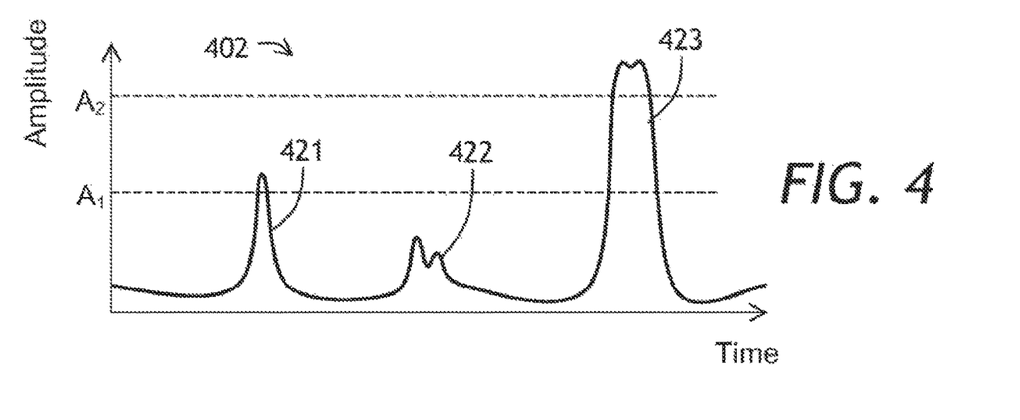
FIG. 4 is a time trace of a noise signal showing a threshold and a pre-defined parameters range.

Thresholding can be used to eliminate non-pulsed noise and/or upstream signal bursts from the analysis. Referring to FIG. 4, a time trace 402 is captured when the amplitude of the cable signal 132 in tire first frequency band 301 and/or its time derivative exceed a predefined threshold $A_1$. For example, when the amplitude of a first peak 421 exceeds the value $A_1$, the entire trace 402 is captured. If the peak amplitude were smaller, e.g. that of a second peak 422, the time trace 402 would not be collected. Another parameter such as the error vector mentioned above can be used in place of the more signal amplitude.

In one embodiment, the time trace 402 is captured only when the amplitude is within a predefined parameter range, for example between. $A_1$ and $A_2$ as shown in FIG. 4. This is a useful option when the upstream bursts themselves, e.g. a third peak 423, are to be excluded from captured time traces, because these bursts are typically of a high amplitude compared to noise.

Referring back to FIG. 3C, once the first autocorrelation peak 331 at one non-zero time delay Δt is detected, the first repetition frequency f of the ingress noise can be determined from the value of Δt as f=1/Δt. However, the autocorrelation function 303 is sometimes so noisy that the first autocorrelation peak 331 at a non-zero time delay cannot be easily discerned. For this case, the autocorrelation function 303 can be averaged by repeatedly obtaining the time traces 302 e.g. 10 to 1000 times, computing the autocorrelation function 303 for each obtained time trace 302, and then averaging the obtained autocorrelation functions 303. Then the first autocorrelation peak 331 can be detected more easily, and, accordingly, the time delay Δt can be found with a better precision and/or fidelity.

Figure 5:
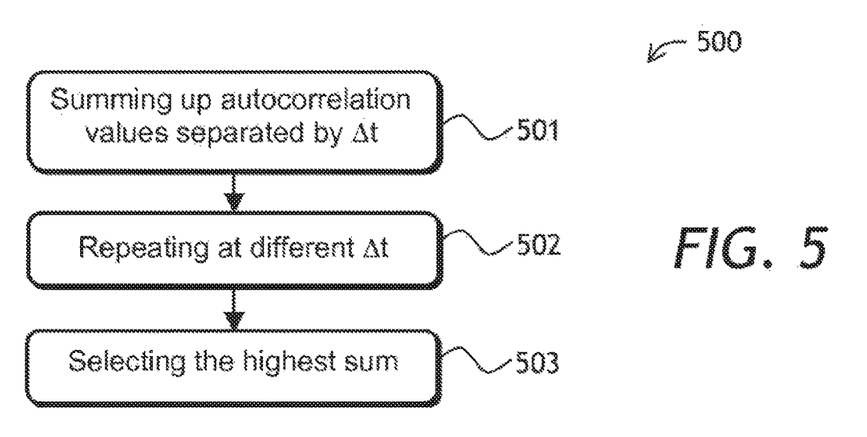
FIG. 5 is a flow chart of an autocorrelation summation analysis according to the invention.

Still referring to FIG. 3C, the autocorrelation function 303 having a single periodic noise component with the time period Δt includes a plurality of peaks 331, 332, and other peaks, not shown, that bear information about the time interval Δt. To recover the time interval Δt from a single autocorrelation function 303, which can also be averaged to improve signal-to-noise ratio, the following method can be used. Referring now to FIG. 5 with further reference to FIG. 3C, a summation method 500 includes a step 501 of summing up N values of the autocorrelation function 303 in multiples of the time interval Δt to obtain a value S(Δt), wherein N is an integer≥2. Then, in a step 502, the previous step 501 is repeated at different values of the time interval Δt. Finally, in a step 503, a value of the time interval Δt is selected that corresponds to a maximum value of S(Δt). To save computational resources, the time interval Δt can be selected to correspond to periods of known types of periodic interference, such as the analog TV sync signal 122, the power line ingress 124, and the RF ingress 126 described above. Alternatively, the entire curve S(Δt) can be calculated, for a range of values of Δt.

The ingress noise can include components at two or more repetition frequencies. In this case, the autocorrelation function 303 will include at least one second autocorrelation peak, not shown, at a second non-zero time delay $\Delta t_2$. The second autocorrelation peak can be much weaker than the first autocorrelation peak 331. To determine the second repetition frequency even in the presence of the strong first autocorrelation peak 331, the time trace 302 can be processed to remove the signal peaks therein corresponding to the first autocorrelation peak 33 i.e., the first to third peaks 321 to 323, respectively, and the autocorrelation function 303 may then be re-computed from the processed time trace 303 to find the second autocorrelation peak. The signal peaks can be removed by identifying peaks at the first time daily Δt, removing the data points corresponding to the peaks, and using linear or polynomial interpolation to fill in the removed data points.

Figure 6A:
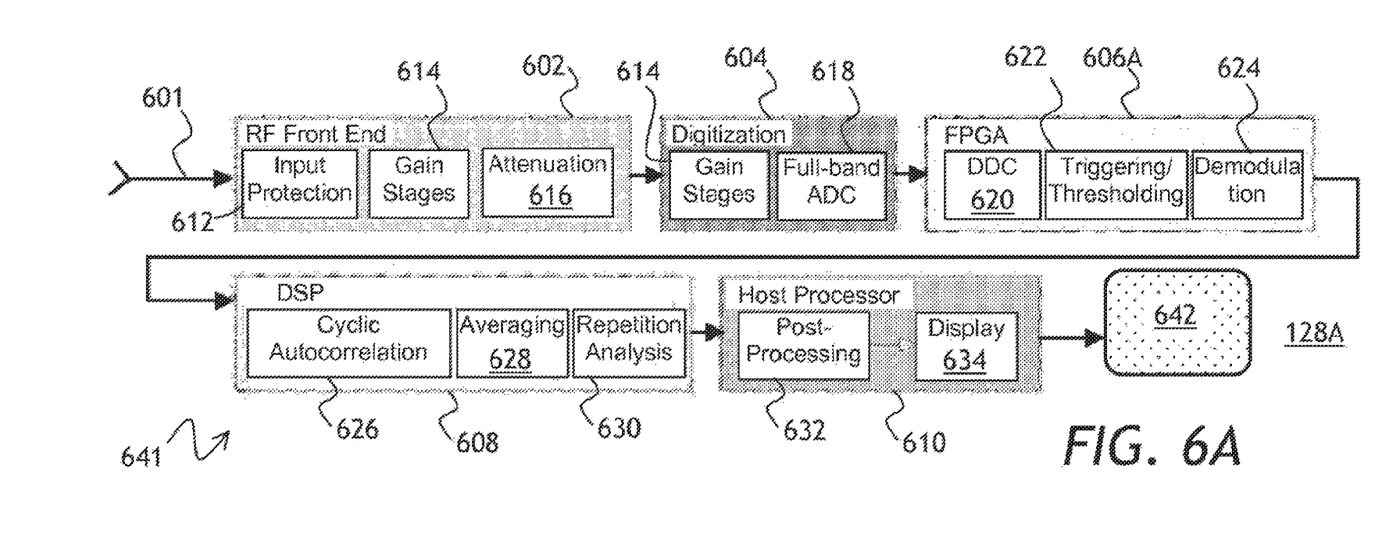
FIGS. 6A and 6B are block diagram of two embodiments of a tester of the invention for practicing the method illustrated in FIG. 2.

Referring to FIG. 6A, an embodiment 128A of the tester 128 generally includes an input terminal 601 for coupling to the first cable network location 131, a processing unit 641 coupled to the input terminal 601, and a display device 642 coupled to the processing unit 641 for displaying frequency spectra and noise repetition information. The processing unit 641 includes five distinct processing modules: an RF from end 602 for conditioning an input RF signal, a digitization module 604 for converting the input RF signal into the digital domain, a Field-Programmable Gate Array (FPGA) module 606A for performing digital down-conversion, thresholding, and demodulation, a Digital Signal Processing (DSP) module 608 for performing autocorrelation, averaging, and repetition analysis, and as host processor module 610, which is the microprocessor of the tester 128, for performing function of data post-processing and preparation of the display screens. The RF front end module 502 includes an input protection circuit 612 for prevention, of a burnout of sensitive gain stages and ADCs, gain stages 614 for amplifying the input signal, and an optional attenuation stage 616. The digitization module 604 has the gain stages 614 coupled to the full-band ADC 618. The gain stages 614 are amplifying the input signal to a level sufficient for full bit depth analog-to-digital conversion. The FPGA module 606A is configured to perform the functions of digital down-conversion (DDC) 620 to remove the carrier frequency, triggering/thresholding 622 as explained above with reference to FIG. 4, and demodulation 624. The DSP module 608 is configured to perform the functions of cyclic autocorrelation 626, averaging 628, and repetition analysis 630 as illustrated by the method 500 of FIG. 5. Finally, the host processor module 610 is programmed to perform a function 632 of preparing (post-processing) the data for displaying to the user, and a function 634 of displaying the data on the display 642 of the tester 128. Generally, the processing unit 641 can include at least one of a FPGA, a digital signal processor, and a microprocessor for performing the steps 201 to 105 of the method 200 of FIG. 2.

Figure 6B:
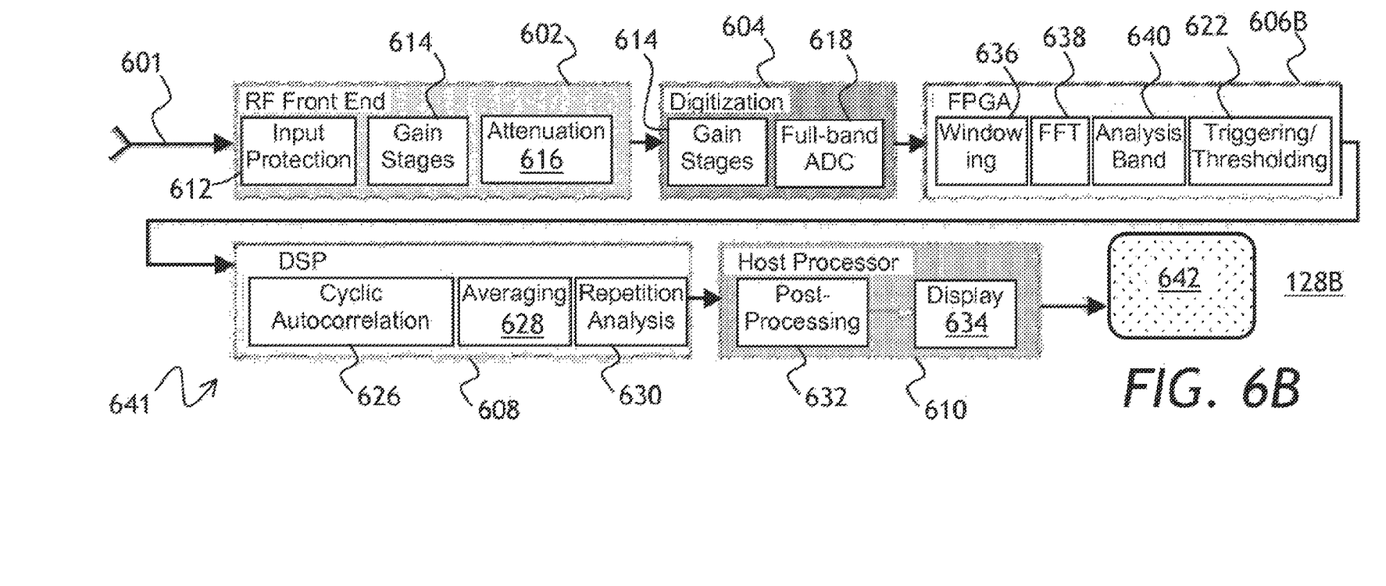

Turning to FIG. 6B, and embodiment 128B of the tester 128 is similar to the embodiment 128A of FIG. 6A, except that the embodiment 128B of FIG. 6B has an FPGA module 606B configured for performing a windowing function 636, a FFT function 638, analysis band selection 640, and triggering/thresholding 622. In this configuration, the FPGA module 606B is suitable for obtaining the time trace 302 via FFT of the frequency spectrum 310, as opposed to direct measurement of the time trace 302. It is to be noted, however, that obtaining the autocorrelation 303 of the time trace 302 is still performed, e.g. by the DSP function 626. The autocorrelation 303 of the time trace 302 is preferred over of time trace, because ingress noise is typically pulsed in nature. A FFT of a repetitious pulse has the pulse spectrum superimposed with the repetition frequency spectrum, which makes the FFT spectrum so rich in features that a repetition analysis is more difficult with FFT than with autocorrelation analysis.

Figure 7:
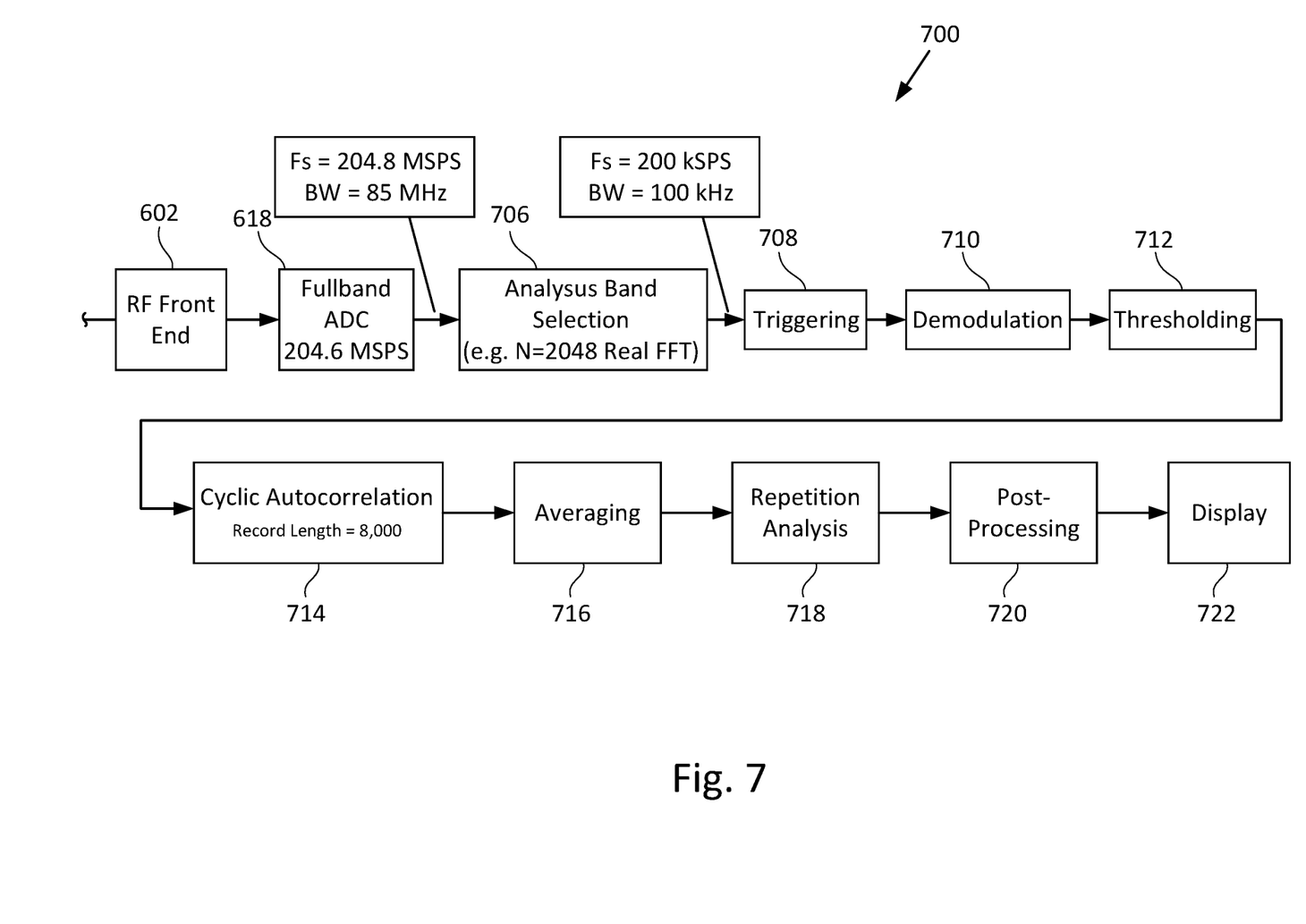
FIG. 7 is a flow chart of a typical ingress noise characterization process showing some elements of tester of FIGS. 6A/6B.

Referring now to FIG. 7 with further reference to FIG. 1, FIG. 3A, and FIGS. 6A and 6B, a typical repetitious noise measurement 700 is performed as follows. The RF front end 602 of the tester 128A or 128B is coupled to the first location 131 of the cable network 100. In this example, the full-band ADC 618 of the tester 128A or 128B of the digitization module 604 digitizes the cable signal 132 at 204.8 megasamples per second, to capture the full upstream bandwidth of 85 MHz. Then, the tester 128 generates the spectrum 310 (FIG. 3A) via 2048-point real-time FFT. In FIG. 3A, only a part of the entire 85 MHz frequency range is shown for simplicity.

Once the analysis band, or the first frequency band 301, is selected in a step 706, the tester 128A or 128B proceeds to obtaining the tune trace 302 by performing triggering 708, thresholding 710, (triggering/thresholding functions 622 of the FPGA 606A or 606B) and/or demodulation 712 (demodulation function 624 of FPGA 606A of FIG. 6A) of the cable signal 132. Then, a cyclic autocorrelation 714 is performed for the time trace 302 (cyclic autocorrelation function 626 in FIGS. 6A and 6B), which in this example is 8000 measurement points long at an update rate of 25 Hz. Then, averaging 716 and repetition analysis 716 are performed as explained above. The obtained data are post-processed at 720 (the post-processing function 632 in FIGS. 6A and 6B) to display spectra annotated with repetitious noise information in a final step 722 (the displaying function 634 in FIGS. 6A and 6B). The time trace can be between 500 to 24,000 points long, and the update rate is preferably higher than 8 Hz.

Figure 8A:
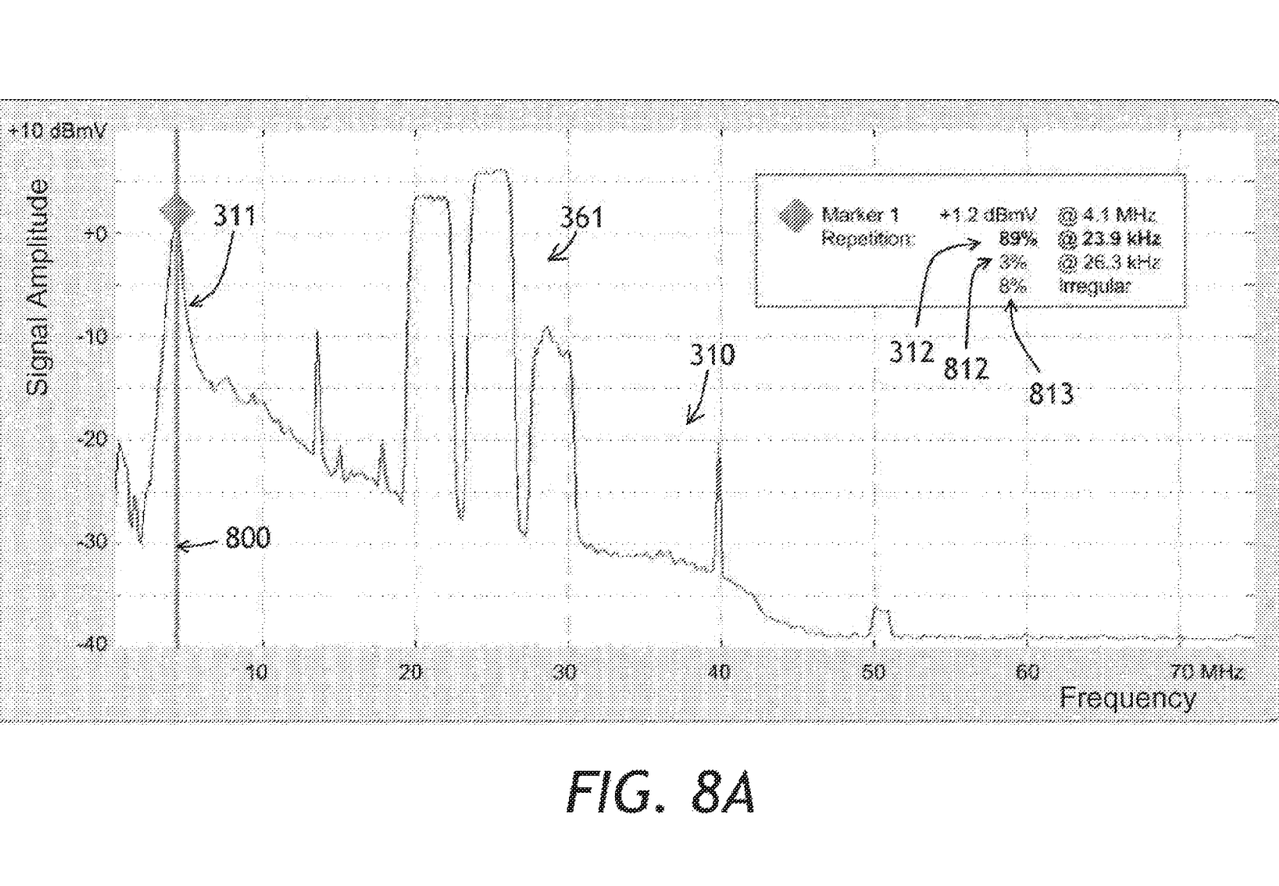
FIGS. 8A and 8B are exemplary information displays of the tester of FIGS. 1, 6A, and 6B, showing repetitious properties of an ingress noise band at 4 MHz.
Figure 8B:
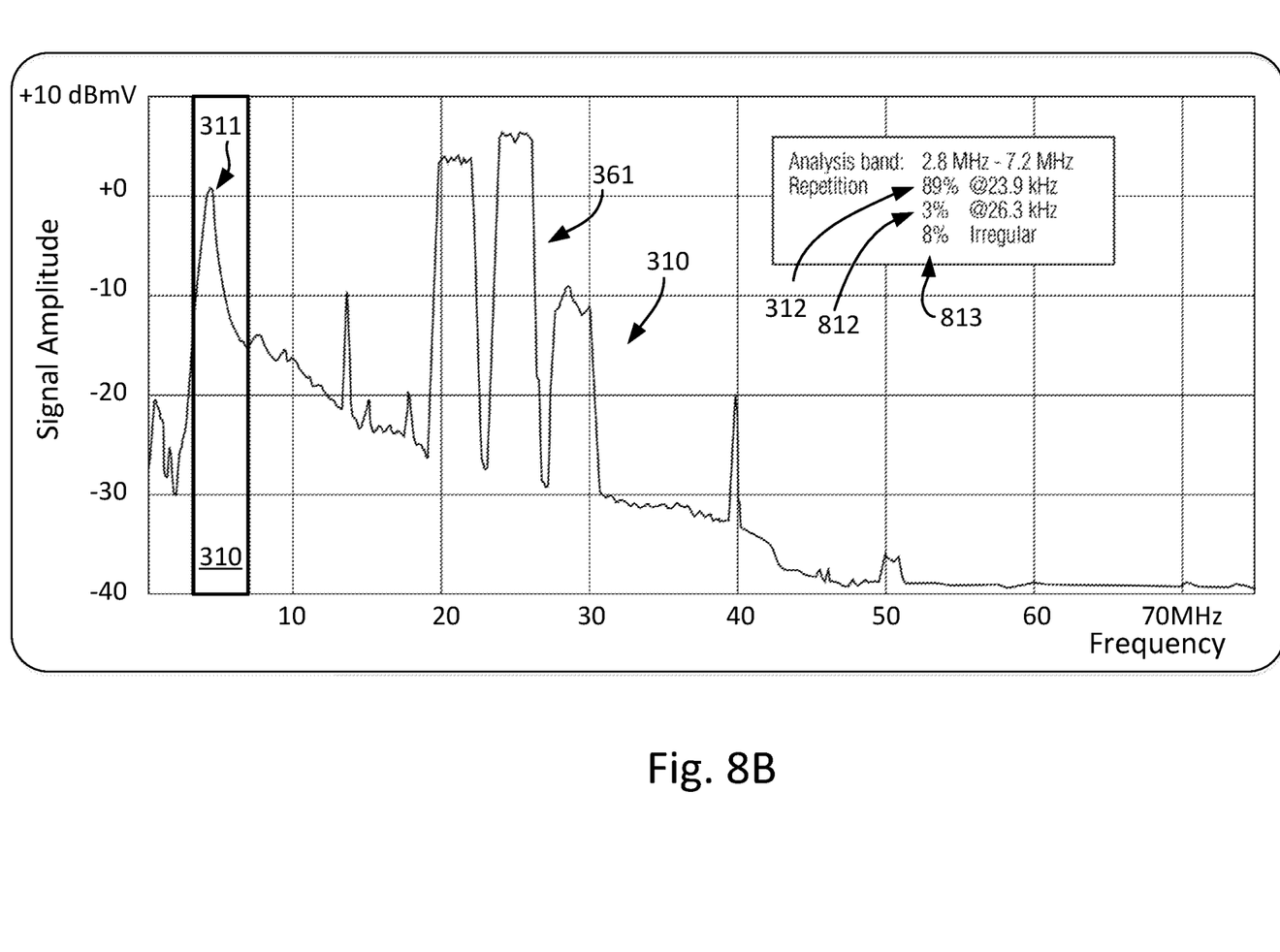

Examples of processing results of repetitious upstream noise will now be given. Referring to FIG. 8A with further references to FIGS. 2 and 7, a marker 800 is automatically placed on the noise peak 311. Any suitable peak detection method can be used. For example, an absolute peak can be found using a gradient method, or a 3 dB bandwidth center can be calculated for each peak. Alternatively, the marker can be placed manually by the user. The tester 128A can be configured to distinguish the sharp noise peak 311 from upstream communication burst peaks 361. The tester 128A performs measurements of repetitious noise characteristics by using the method 200 of FIG. 2, with the optional details provided by the method 700 of FIG. 7. The first repetition frequency is displayed at 312, and the second repetition frequency is displayed at 812, together with relative proportions of the noise at these frequencies into the noise peak 311. The noise that does not have any repetitious components is, displayed as "Irregular" at 813. An alternative is shown in FIG. 8B, wherein the first frequency band 301 is manually selected by a technician.

Figure 9:
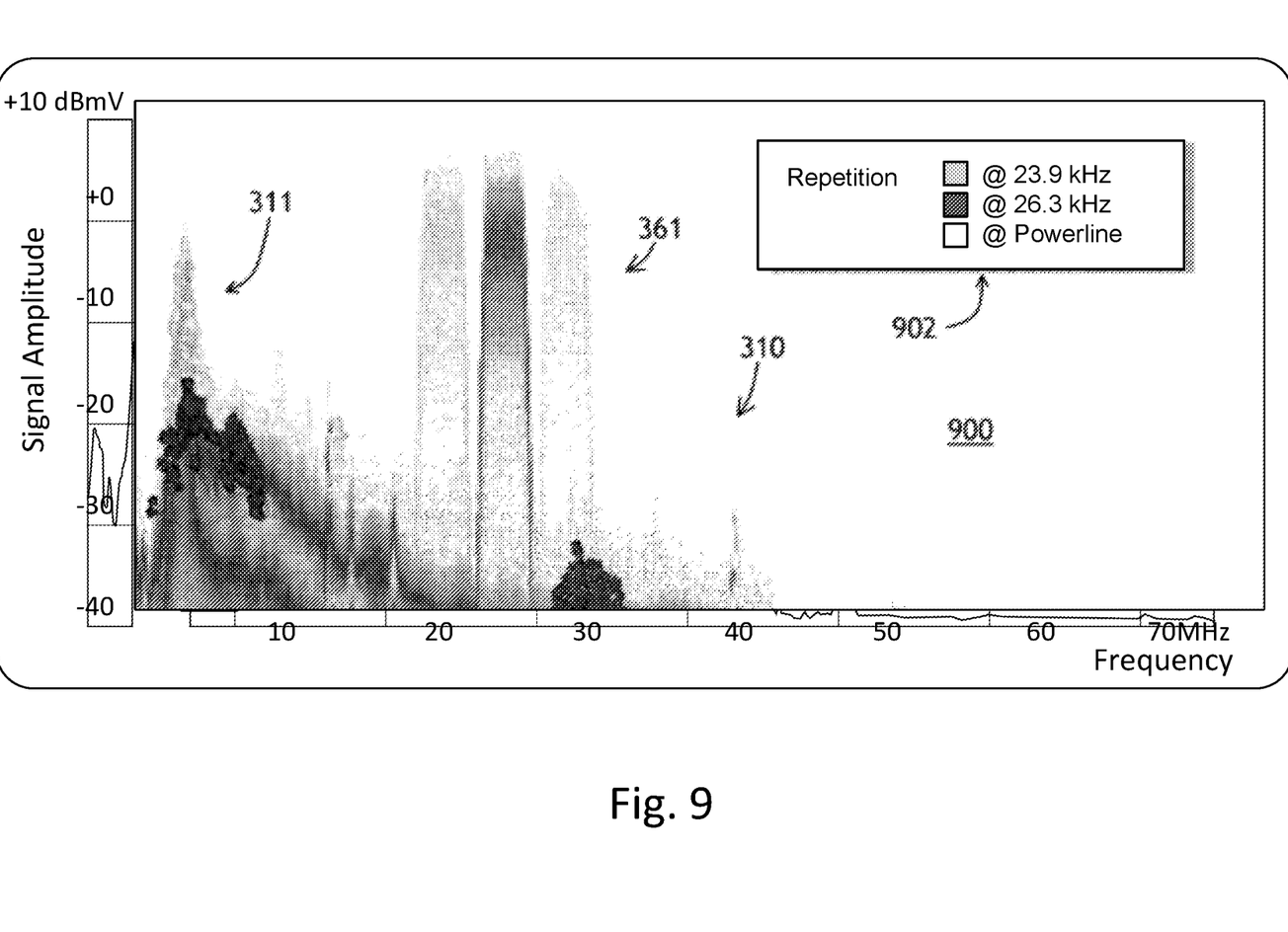
FIG. 9 is an exemplary information display of the tester of FIGS. 1, 6A, and 6B, showing repetitious properties of multiple ingress noise bands.

Turning to FIG. 9, the repetitious properties of ingress noise are shown on a "heat map" 900 showing the frequency spectrum 310 in the color/shading form. For each frequency, the color and shading illustrate different periodicity components inside the real-time, histogram spectrum display 900. Thresholding and trigger windows can be swept in level to, determine and illustrate relationships 902 between periodicity and level.

Figure 10A:
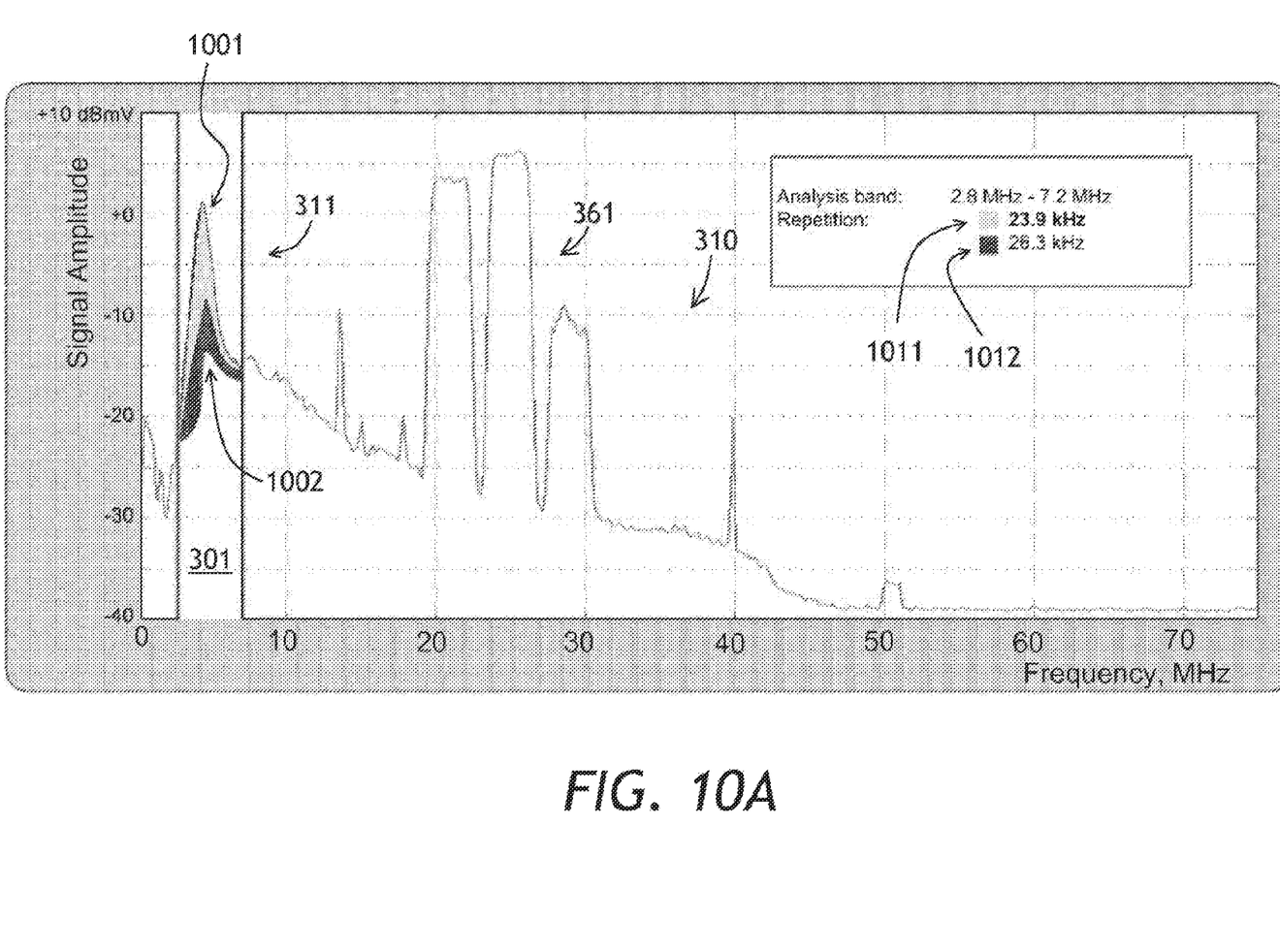
FIGS. 10A and 10B are exemplary information displays of the tester of FIGS. 1, 6A, and 6B, showing repetitious properties at an out-of-band and in-band ingress noise, respectively, by means of differently shaded or colored areas.

Referring back to FIGS. 3B and 3C, when the noise peak 311 in the first frequency band 301 includes two repetitive components, the autocorrelation function 303 of the time trace 302 will include the second autocorrelation peak (not shown) at a second non-zero time delay indicative of the second repetitive component of the no peak 311. For this case, the peak 311 is shaded or colored, different shades or colors corresponding to the respective magnitudes of the first and second frequency components. Referring to FIG. 10A, the noise peak 311 includes firm and second distinctly colored or shaded areas 1001 and 1002, corresponding to the first and second repetitive noise components, respectively. The relative size and/or position of the colored or shaded areas 1001 and 1002 correspond to a relative magnitude of the first and second repetitive noise components. In this way, the first and second repetition frequencies can be color-coded by their representative colors, as indicated at 1011 and 1012, respectively.

Figure 10B:
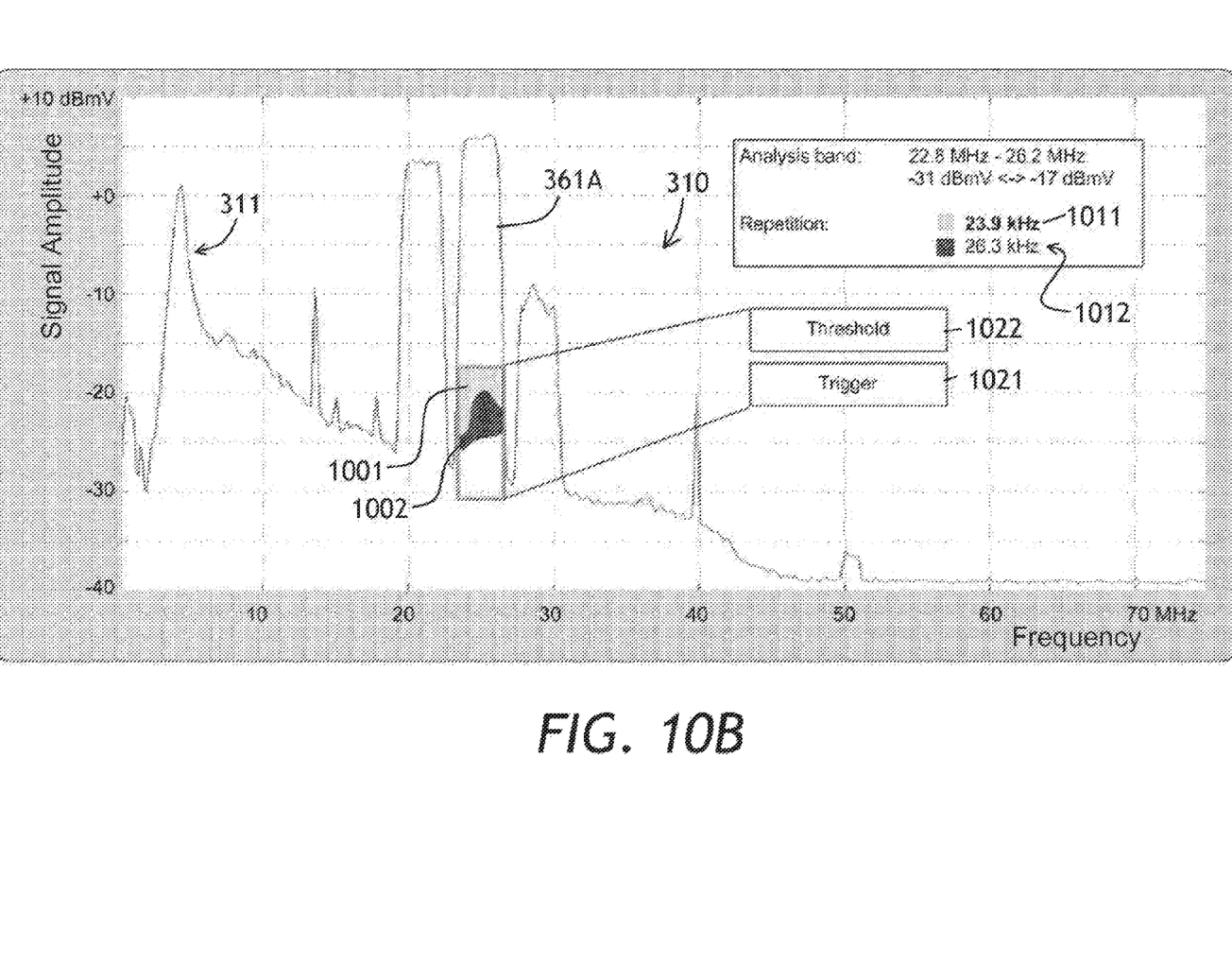

It is to be noted that not only pure noise peaks, but also noise within communication spectral bands can be displayed in this manner. Turning to FIG. 10B with further reference to FIG. 4, a time trace of the cable signal 132 in an upstream band 361A is triggered at a triggering threshold 1021 corresponding to the lower amplitude $A_1$ in FIG. 4; in addition, the time trace 302 is only captured when the cable signal 132 is smaller than the upper threshold 1022 corresponding to the higher amplitude $A_2$ in FIG. 4. In this case, the shaded areas 1001 and 1002 can be plotted inside the upstream band 361A, as shown in FIG. 10B.

Figure 11:
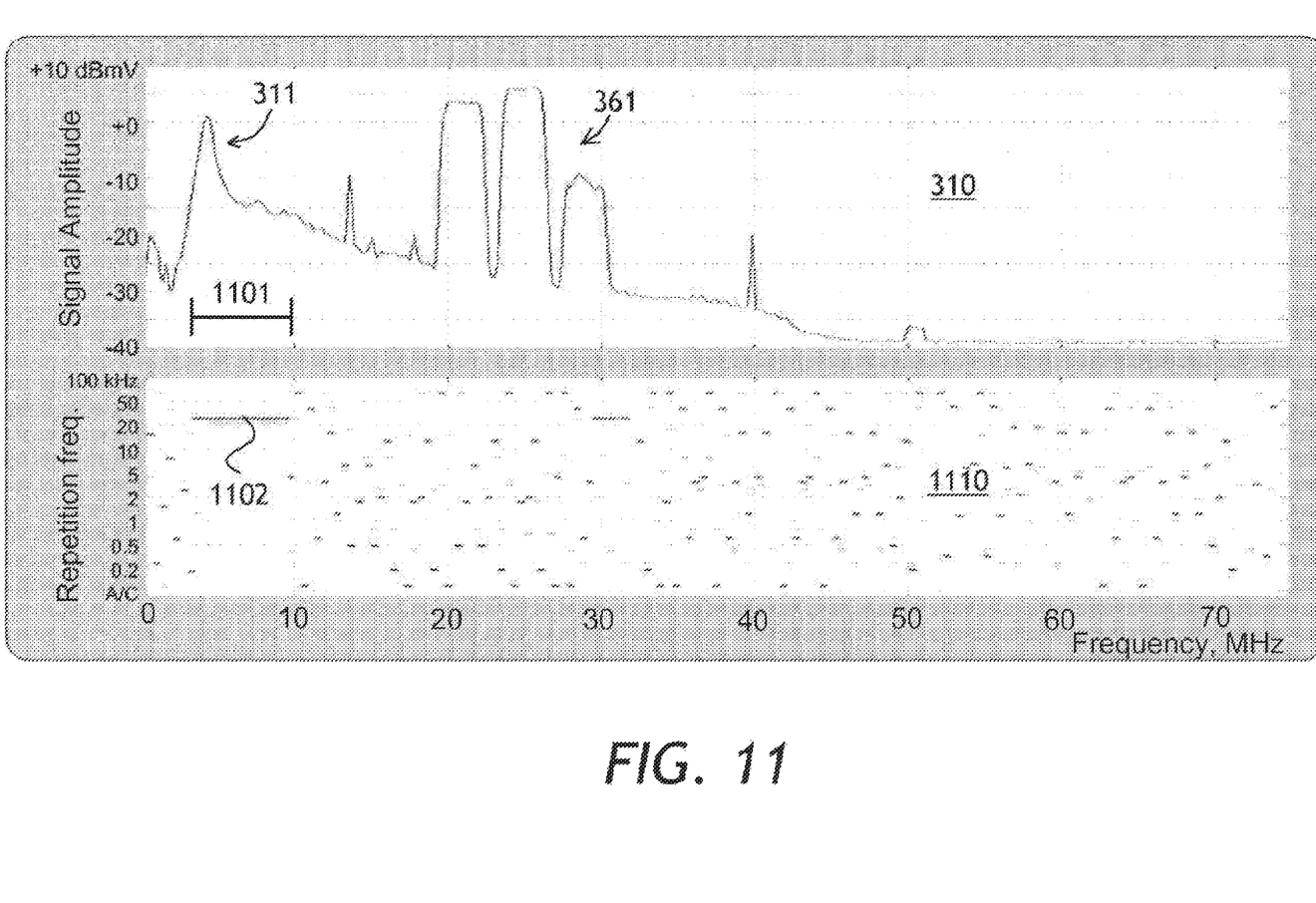
FIG. 11 is an exemplary information display of the tester of FIGS. 1, 6A, and 6B, wherein the repetition frequencies of the frequency peaks are displayed on a common frequency axis graph disposed under the frequency spectrum.

Referring to FIG. 11, a similar embodiment of presenting repetition properties of ingress noise is presented. A plurality of repetition frequencies for each frequency are displayed on a common frequency axis graph 1110 disposed under the frequency spectrum 310. As a minimum, the graph 1110 can include at least one repetition frequency far at least. One frequency band, for example, a frequency band 1101 showing a single repetition frequency 1102 of approximately 25 kHz. The repetition frequency graph can also be disposed proximate to, or superimposed with, the frequency spectrum 310.

While a detailed set of repetition frequencies is usually not known for each network location, fair assumptions can often be made as what type of noise may be prevalent in what network area. As technicians learn new sources of ingress noise, they can associate those sources with particular network locations for future use. By way of a non-limiting example, the ingress noise can be characterized at the first location 131 (FIG. 1) according to the method 200 of FIG. 2, and then the network technician can proceed to a second cable network location associated with the first repetition frequency, determined upon computing the autocorrelation function in step 203. For instance, the technician can decide to travel to the noisy customer premises 104a based on previously recorded noise sources at that location.

The hardware used to implement the various illustrative logics, logical blocks, modules, and circuits described in connection with the aspects disclosed, herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of interprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device to identify noise in a cable network, the device comprising:
 a spectrum analyzer to:
  obtain a frequency spectrum of a cable signal at a first cable network location, wherein the cable signal includes a digital signal from a digital source and noise from a noise source;
  generate a time trace of a first parameter of the cable signal at a first frequency of the obtained frequency spectrum;
  compute an autocorrelation function of the time trace;
  identify a plurality of peaks in the autocorrelation function;
  determine a time delay between the plurality of peaks based on a summation analysis of the computed autocorrelation function and the identified plurality of peaks; and
  identify a first repetition frequency of a component of the noise from the time delay, wherein the first repetition frequency is indicative of a type of the noise source.

2. The device of claim 1, comprising a display device to display at least one of the frequency spectrum and the first repetition frequency.

3. The device of claim 1, comprising an output device to transmit the time delay to a remote device.

4. The device of claim 1, comprising a hardware processor to implement the spectrum analyzer, the hardware processor comprising at least one of a Field-Programmable Gate Array (FPGA), a digital signal processor, and a microprocessor.

5. The device of claim 4, comprising an input terminal to couple to the first cable network location, wherein the hardware processor comprises a radio frequency (RF) front end coupled to the input terminal of the device, and an ADC coupled to the RF front end, to digitize an output signal of the RF front end.

6. The device of claim 4, comprising an input terminal to couple to the first cable network location, wherein to generate the time trace of the first parameter of the cable signal at the first frequency, the hardware processor is to at least one of:
 dwell the spectrum analyzer at a first frequency band for a dwelling time and capture an output signal of the spectrum analyzer; and
 perform a real-time fast Fourier transform (FFT) of the obtained frequency spectrum.

7. The device of claim 4, wherein the time delay is a first time delay and the autocorrelation function includes peaks separated by a second time delay different from the first time delay, wherein the hardware processor is to:
 remove, from the time trace, peaks corresponding to the first time;
 compute the autocorrelation function to find the second time delay; and
 determine a second repetition frequency based on the computed autocorrelation function.

8. The device of claim 7, wherein to remove the peaks from the time trace, the hardware processor is to remove data points corresponding to the first time delay from the time trace, and fill in the removed data points.

9. The device of claim 4, wherein the hardware processor is to:
 generate a plurality of the time traces;
 compute autocorrelation functions for the plurality of time traces;
 average the computed autocorrelation functions; and
 determine the time delay from the averaged autocorrelation functions.

10. The device of claim 4, wherein the hardware processor is to:
 (a) sum a plurality of values of the autocorrelation function at multiples of the time delay to calculate a summed value for the autocorrelation function;
 (b) repeat (a) at a plurality of time delays different than the time delay to calculate a plurality of summed values; and
 (c) select a time delay corresponding to a maximum value of the summed values.

11. A method to identify noise in a cable network, the method comprising:
 obtaining, by a hardware processor, a frequency spectrum of a cable signal at a first cable network location wherein the cable signal includes a digital signal from a digital source and noise from a noise source;
 generating a time trace of a parameter of the cable signal at a first frequency of the obtained frequency spectrum;
 computing an autocorrelation function of the time trace;

identifying a plurality of peaks in the autocorrelation function;

determining a time delay between the plurality of peaks based on a summation analysis of the computed autocorrelation function and the identified plurality of peaks; and identifying a first repetition frequency of a component of the noise from the time delay, wherein the first repetition frequency is indicative of a type of the noise source.

12. The method of claim 11, comprising displaying at least one of the frequency spectrum and the first repetition frequency.

13. The method of claim 11, comprising transmitting the time delay to a remote device.

14. The method of claim 11, wherein generating the time trace comprises at least one of:

dwelling a spectrum analyzer at a first frequency band for a dwelling time and capturing an output signal of the spectrum analyzer; and performing a real-time fast Fourier transform (FFT) of the obtained frequency spectrum.

15. The method of claim 11, wherein the time delay is a first time delay and the autocorrelation function includes a second autocorrelation peak separated from the first peak by a second time delay different from the first time delay, the method comprising:

removing, by the hardware processor, peaks from the time trace corresponding to the first autocorrelation peak;

computing, by the hardware processor, the autocorrelation function to find the second autocorrelation peak; and determining, by the hardware processor, a second repetition frequency based on the computed autocorrelation function.

16. The method of claim 15, wherein removing the peaks from the time trace comprises removing data points corresponding to the first autocorrelation peak from the time trace, and filling in the removed data points.

17. The method of claim 15, comprising:

obtaining a plurality of the time traces;

computing autocorrelation functions for the plurality of time trace;

averaging the computed autocorrelation functions; and determining the first autocorrelation peak and the first time delay from the averaged autocorrelation functions.

18. The method of claim 11, comprising:

(a) summing a plurality of values of the autocorrelation function at multiples of the time delay to obtain a summed value for the autocorrelation function;

(b) repeating (a) at a plurality of time delays different than the time delay to obtain a plurality of summed values; and (c) selecting a time delay corresponding to a maximum value of the summed values.

19. A cable network testing device operable to test for ingress noise in a cable network, the cable network testing device comprising:

an input terminal to couple the cable network testing device to the cable network;

a spectrum analyzer to:

receive a cable signal from the cable network via the input terminal, wherein the cable signal includes a digital signal from a digital source and noise from a noise source;

generate a time trace of a first parameter of the cable signal at a first frequency of a frequency spectrum of the cable signal;

compute an autocorrelation function of the time trace;

identify a plurality of peaks in the autocorrelation function;

determine a time delay between the plurality of peaks based on a summation analysis of the computed autocorrelation function and the identified plurality of peaks; and identify a first repetition frequency of a component of the noise from the time delay, wherein the first repetition frequency is indicative of a type of the noise source; and a display to display at least one of the frequency spectrum and the first repetition frequency.

* * * * *